(12) United States Patent  
Rouyre

(10) Patent No.: US 7,607,614 B2  
(45) Date of Patent: Oct. 27, 2009

(54) TRANSITION SHIM BETWEEN STRUCTURE FOR FASTENING A WING TO A FUSELAGE OF AN AIRCRAFT, AND AIRCRAFT HAVING SUCH A SHIM

(75) Inventor: François Rouyre, Cornebarrieu (FR)

(73) Assignee: Airbus France, Toulouse (FR)

( * ) Notice: Subject to any disclaimer, the term of this patent is extended or adjusted under 35 U.S.C. 154(b) by 713 days.

(21) Appl. No.: 11/114,659

(22) Filed: Apr. 26, 2005

(65) Prior Publication Data

US 2005/0247821 A1    Nov. 10, 2005

(30) Foreign Application Priority Data

May 4, 2004    (FR)    ................................. 04 50859

(51) Int. Cl.
    *B64C 1/00*    (2006.01)
(52) U.S. Cl. ....................................... 244/131; 244/119
(58) Field of Classification Search ................. 244/119, 244/120, 117 R, 131, 123, 124
    See application file for complete search history.

(56) References Cited

U.S. PATENT DOCUMENTS

| 3,499,622 | A | * | 3/1970 | Surcin et al. ................. 244/130 |
| 4,885,885 | A | * | 12/1989 | Gottschling .............. 52/396.05 |
| 6,581,877 | B2 | * | 6/2003 | Pauly .......................... 244/131 |
| 6,655,635 | B2 | * | 12/2003 | Maury et al. ................. 244/131 |

FOREIGN PATENT DOCUMENTS

| FR | 2 827 029 | 1/2003 |
| GB | 1 225 511 | 3/1971 |

* cited by examiner

*Primary Examiner*—Tien Dinh
(74) *Attorney, Agent, or Firm*—Patterson, Thuente, Skaar & Christensen, P.A.

(57) ABSTRACT

A shim adapted for positioning on the upper surface of at least one wing of an aircraft. The shim restores an aerodynamic profile of the wing at the position of a zone of transition between structure fastening the wing to the fuselage of the aircraft and the upper surface of the aircraft. The shim enables a seal to run from the fastening structure to the upper surface of the wing, in eliminating the zones at which the seal may break open. An aircraft provided with such a shim is also disclosed.

9 Claims, 2 Drawing Sheets

TRANSITION SHIM BETWEEN STRUCTURE FOR FASTENING A WING TO A FUSELAGE OF AN AIRCRAFT, AND AIRCRAFT HAVING SUCH A SHIM

RELATED APPLICATION

The present application claims priority to French Application No. 04 50859 filed May 4, 2004.

FIELD OF THE INVENTION

The invention pertains to the field of aeronautics. In particular, the invention relates to a shim designed to facilitate the passage of a seal from the structure fastening the wing to the fuselage up to the extrados or upper surface of the wing so that the seal has a constant rate of compression on the fastening means and on the upper surface of the wing. The invention also relates to an aircraft provided with a ventral fairing fixed to a bottom part of a fuselage of said aircraft. The invention relates more precisely to a fastening zone between a wing structure of the aircraft and the fuselage of said aircraft.

BACKGROUND ART

In the field of aeronautics, there are different types of known wing structures, especially wing structures provided with two wings positioned on either side of a fuselage of the aircraft. For example, there is a known wing structure provided with two upper wings, i.e. the wings are laid on the fuselage in such a way that, seen in profile, each wing in its entirety is placed above the fuselage. There is also a known wing structure provided with two median wings. The median wings are fixed in the neighborhood of the diametric plane of the fuselage. Finally, there is a known wing structure with lower wings. In this case, the intrados or lower surface of the wing goes through the fuselage.

Furthermore, there are known aircraft provided with a ventral fairing. For example, in the case of a wing structure with low wings, the ventral fairing is fixed to the position of a lower part of the fuselage, at the intersection of the fuselage with the wing structure. The ventral fairing blocks the lower part of the fuselage. The cradle-shaped ventral fairing is provided with a base and two flanges or longitudinal panels rising up laterally on either side of said fuselage. Each panel is provided with an opening capable of letting through a wing of the wing structure of the aircraft.

In certain cases, there is a known way of positioning a seal on an inner rim of each opening, namely between an internal wall bordering the opening and the wing crossing said opening. Such a seal must prohibit the circulation of air inside the fairing through the opening. Indeed, an air passage of this kind prompts a vibration of the seal. This vibration may create a noise that is audible inside the cabin of the aircraft, thus creating auditory discomfort for occupants of the cabin. Furthermore, this vibration is transmitted to the fuselage and to the elements that it comprises, giving rise to structural stress and fatigue in those elements. Furthermore, the vibration of the seal favors a wearing out of the seal and the wearing out may lead to a premature tearing of the seal. Finally, this vibration gives rise to parasitic aerodynamic drag.

In certain aircraft, the seal in the upper surface region of the wing travels from the structure fastening the wing to the fuselage up to the upper surface and/or lower surface of the wing. Now, generally, the fastening structure forms an extra thickness at the position of the upper surface and/or lower surface of the wing. For example, the fastening structure is a linking metal fitting used to hold the wing to the fuselage. A first part of the metal fitting is fixedly joined to the fuselage while a second part of the metal fitting is fixedly joined to the upper surface of the wing. The second part of the metal fitting is fixed by any means to the upper surface of the wing. A thickness of the second part of the metal fitting, fixedly joined to the upper surface of the wing, thus forms an extra thickness on the upper surface of the wing that may go up to about 15 millimeters. Thus, the seal, traveling from the fastening structure to the upper surface of the wing, is subjected to a difference of level. A difference of level of this kind may lead to poor adhesion of the seal at the position of a zone of transition between the fastening structure and the upper surface of the wing, i.e. the seal will not be sufficiently compressed between the wall bordering the opening and the transition zone between the fastening structure and the upper surface of the wing. This results in a passage of air from the exterior to the interior of the ventral fairing.

SUMMARY OF THE INVENTION

It is an aim of the invention therefore to provide for perfect adhesion of the seal from the fastening structure to the upper surface and/or lower surface of the wing in order to enable perfectly impervious sealing between the external and the interior of the ventral fairing. To this end, the invention proposes a transition shim between the structure fastening the wing to the fuselage of the aircraft and the wing. The shim is positioned on the wing at the position of the zone of transition between the two surfaces, so as to restore an aerodynamic profile of the wing. The shim therefore has a thickness that tends to decrease from a thickness substantially equal to the thickness of the fastening structure to a thickness that is almost zero corresponding to the level of the upper surface or the lower surface of the wing. Thus, the seal is progressively accompanied from the fastening structure to the wing so that it can be subjected to a constant rate of compression. Advantageously, this transition shim is made out of an expanded synthetic resin material. Such a material has a low mass, so that the total weight of the aircraft is not increased to an excessive extent. Furthermore, the use of such a material simplifies the fixing of the shim to the wing.

It is an aim of the invention to provide for imperviously tight sealing between a panel of the ventral fairing and the fuselage of the aircraft at the position of a zone for fixing a wing of the wing structure to said fuselage. More precisely, the aim of the invention is to ensure that the seal, positioned at the internal periphery of an aperture feature made on the panel of the ventral fairing so as to let the wing structure wing pass through, is subjected to a homogenous compression rate throughout the profile of the wing. It is another aim of the invention to increase the service life of the seal.

An object of the invention therefore is a transition shim between structure fastening a wing to a fuselage of an aircraft and the wing, the aircraft being provided with a ventral fairing provided with a base and two panels extending radially relative to the base and rising laterally along the fuselage, each panel being provided with an opening capable of letting through a wing of the aircraft, wherein the shim is capable of being positioned on a wing against an edge of the fastening means, at the position of a zone of transition between the fastening structure and the wing, a slope of the shim enabling the restoring of an aerodynamic profile of the wing.

In particular exemplary embodiments of the shim of the invention, the shim may comprise all or part of the following additional characteristics:

it can be positioned on the upper surface of the wing;
it can be positioned on the lower surface of the wing;
it is made of an expanded synthetic resin material;
it is bonded to the wing;
it is provided with rounded edges;
an external surface of the shim is covered with a primer, for example a mastic primer;
an external contour of the shim follows an external contour of the fastening structure at the position of a zone of contact between the shim and the fastening structure.

An object of the invention is also an aircraft comprising:
a fuselage;
a wing structure comprising two wings fixed on either side of the fuselage, each wing being held on the fuselage by means of a fastening structure,
a ventral fairing fixed to the lower part of the fuselage, the ventral fairing comprising a base and two panels extending radially relative to the base and rising laterally along the fuselage, each panel being provided with an opening capable of letting a wing pass through,
a seal fixed to the periphery of each opening, the seal being at least partially positioned between an internal wall of the opening and the wing,
wherein the aircraft comprises, on at least one wing, a shim capable of restoring an aerodynamic profile of the wing at the position of a zone of transition between the structure fastening the wing to the fuselage and the wing.

In one particular example of an embodiment of the invention, the aircraft may comprise all or part of the following additional characteristics:
it has a shim on the upper surface of at least one wing;
it has a shim on the lower surface of at least one wing;
the shim has a slope such that a rate of compression of the seal, on the one hand between the fastening means and the internal wall of the opening and, on the other hand, between the upper surface of the wing and the internal wall of the opening is homogenous, the seal running from the fastening means to the wing in passing through the shim.

BRIEF DESCRIPTION OF THE DRAWINGS

The invention shall be understood more clearly from the following description and the accompanying figures. These figures are given by way of an indication and in no way restrict the scope of the invention. Of these figures.

DETAILED DESCRIPTION

Figure 1:
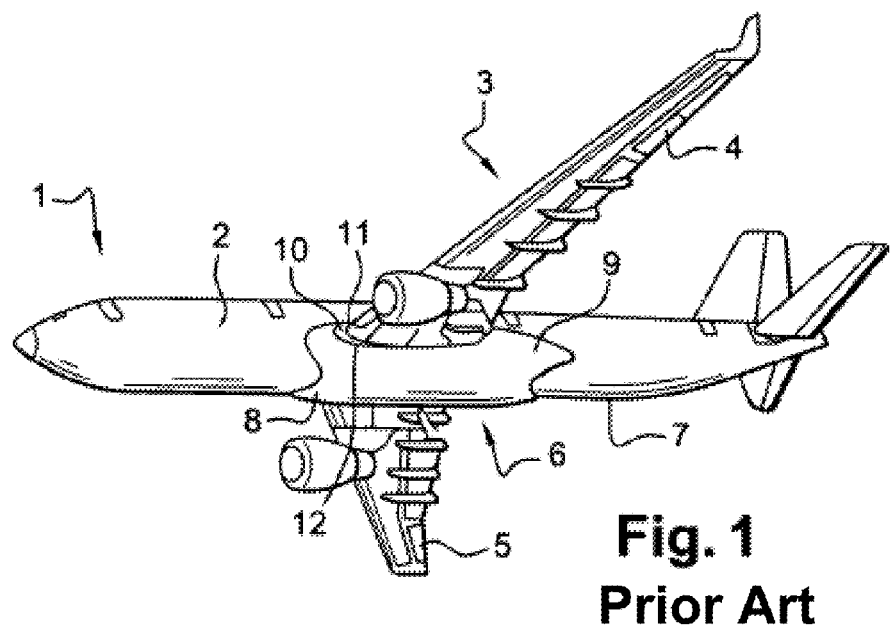
FIG. 1 depicts an aircraft that is provided with a ventral fairing and is capable of being provided with the shim of the invention.

FIG. 1 depicts an aircraft 1 provided with a fuselage 2 and a wing structure 3. The wing structure 3 is provided with two half-wing structures or wings 4 and 5, positioned on either side of the fuselage 2. The aircraft 1 also has a ventral fairing 6 fixed to a lower part 7 of the fuselage 2. The ventral fairing 6 is provided with a base 8 and two side panels 9 (only one panel being depicted in FIG. 1). The panels 9 extend radially relative to the base 8 and rise laterally along the fuselage 2 on either side of said fuselage 2. Each panel 9 is provided with an opening 10 capable of letting a wing 4 or 5 pass through. The opening 10 is located at the position of a fastening zone 11 of the wing 4 or 5 on the fuselage 2 of the aircraft 1. A seal (not shown in FIG. 1) such as a lip seal is positioned on the internal periphery 12 of each opening 10, between an inner wall of the opening 10 and the wing 4 or 5.

Figure 2:
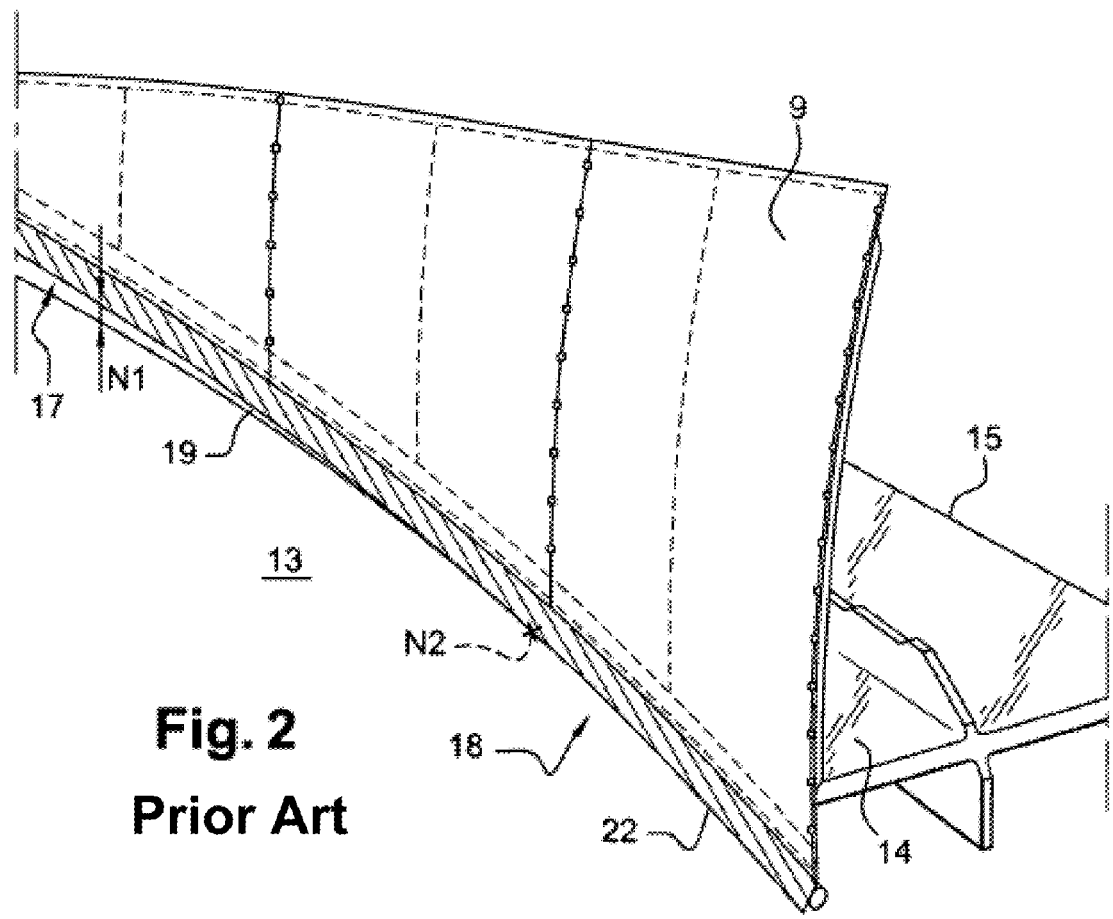
FIG. 2 depicts a wing of the aircraft at the position of a zone of transition between structure fastening the wing to a fuselage of the aircraft and the wing.

FIG. 2 gives a more detailed view of the zone 11 in which the wing 4 of the aircraft 1 is fastened to the fuselage 2. More specifically, FIG. 2 shows the upper surface 13 of the wing 4 and a fastening structure 15 adapted for connecting the wing 4 to the fuselage 2. The fastening structure 15 is, for example, a metal fitting 15 formed by two parts respectively fixed to the fuselage 2 (FIG. 1) and the upper surface 13 of the wing 4. A part 14 of the metal fitting 15, fixedly joined to the upper surface 13 of the wing 4, has a thickness such that it forms an extra thickness on the upper surface 13 of the wing 4.

FIG. 2 also shows the arrangement of the seal 22. The seal 22 is made to run from a first zone 17 located on the part 14 of the fastening structure 15 to a second zone 18 located on the upper surface 13. A position of the seal 22 must pass from a level N1, at the position of the fastening structure 15 capable of having a thickness running up to about fifteen millimeters, up to the level N2 equivalent to a level zero at the position of the upper surface 13 of the wing 4. There is therefore a risk that the seal 14 might open at the position of a transition zone 19 between the fastening structure 15 and the upper surface 13 of the wing 4. Indeed, the part of the seal 22 located in the transition zone 19 is not accompanied in this transition between the level N1 and the level N2. There is therefore a risk of poor installation of the seal in the transition zone 19.

Figure 3:
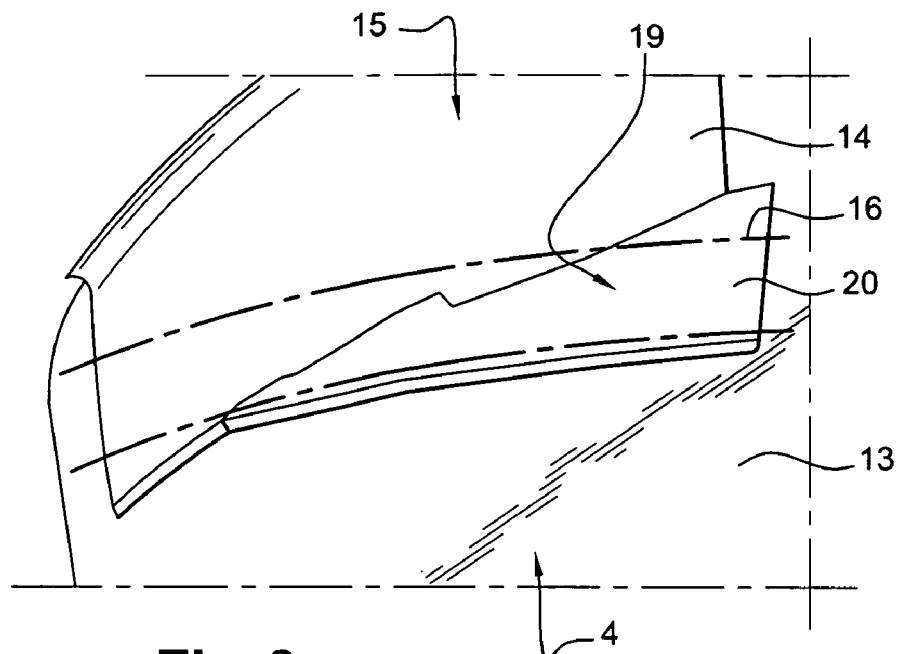
FIG. 3 depicts the wing of FIG. 2 provided with a shim according to an example of an embodiment of the invention.

FIG. 3 shows an example of an embodiment of a transition shim 20 located in the transition zone 19 between the part 14 of the fastening means 15 and the upper surface 13 of the wing 4 according to an example of an embodiment of the invention, as well as the arrangement 16 of the seal. A position of the shim 20 is such that the zone travels from the part 14 of the fastening structure 15 up to the upper surface 13 of the wing 4 in passing through the shim 20.

Figure 4:
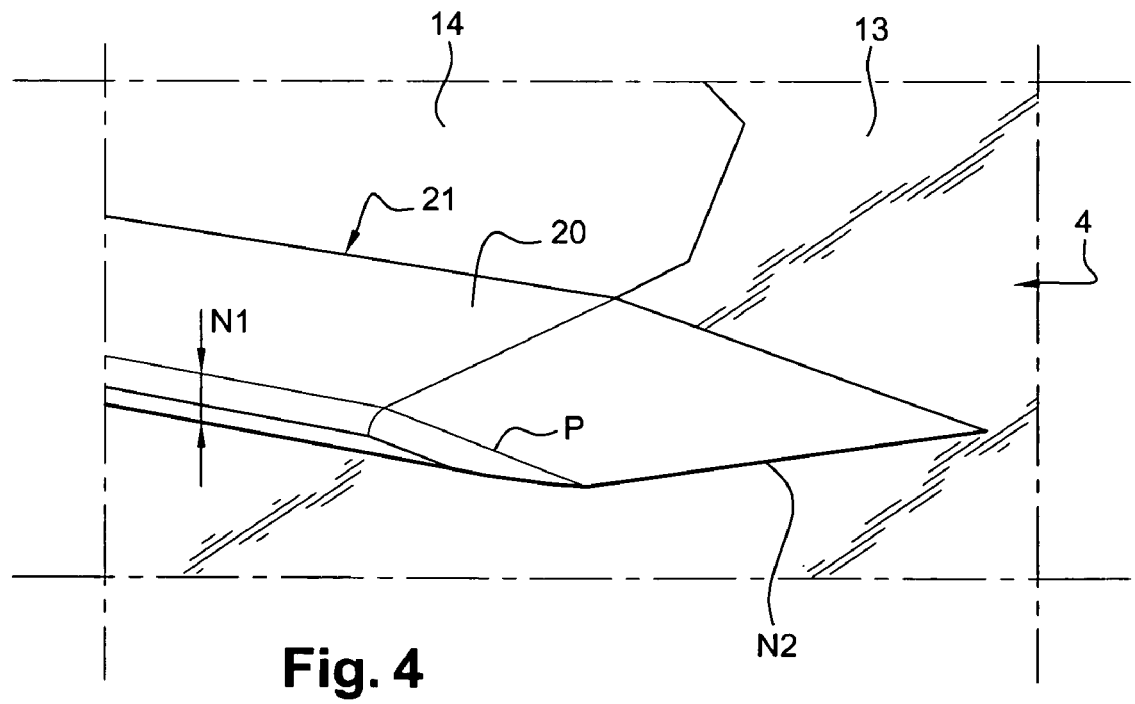
FIG. 4 depicts an enlarged, fragmentary view of the shim of FIG. 3.

FIG. 4 is an enlarged view of the shim 20. It can be seen that the shim 20 has a profile enabling the restoration of an aerodynamic profile of the wing 4, i.e. that the shim 20 enables a continuous transition between the level N1 of the part 14 of the fastening structure 15 and the level N2 of the upper surface 13 of the wing 4. A slope P of the shim 20 is such that the seal, when compressed between the shim 20 and the inner wall of the opening 10 (FIG. 1), is subjected to compression at a constant rate, i.e. the seal does not open at any position. The shim 20 is provided with a thickness at the position of a contact with the part 14 of the fastening structure 15 equal to the level N1 of the part 14 of the fastening means 15. Then the thickness of the shim 20 decreases to reach zero thickness.

The shim 20 may have an external contour that at least partially follows an external contour of the part 14 of the fastening structure 15 at the position of a zone of contact 21 between the shim 20 and the part 14 of the fastening structure 15. Thus, the shim 20 may get fitted, for example, into a relief feature of the part 14 of the fastening structure 15. In general, a complementarity of this kind between the two structures 14 and 20 in the contact zone 21 optimizes the continuous passage of the seal from the fastening means 15 to the upper surface 13 of the wing 4 and thus reduces the risk of the seal opening at particular points.

One particular exemplary embodiment of the invention uses an expanded synthetic resin material to make the shim 20. For example, it is possible to use expanded foam made out of Plexiglas® material. The use of such a material enables the making of a shim 20 of low mass. Low mass facilitates the mounting of the shim 20 on the upper surface 13 of the wing 4. The shim 20 can be easily positioned by just one person. The shim 20 may also be shifted, as need be, so as to be positioned on the wing 4 in the most suitable way relative to the seal. Furthermore, when the shim 20 is made out of an expanded synthetic resin material, it is possible to fix this shim 20 to the upper surface 13 of the wing 4 by simple bonding. A shim 20 of this kind can easily be detached and then stuck on again without any risk of damaging the wing 4 or the shim 20 itself. Furthermore, since a material of this kind can be easily modeled, the shim 20 can be reshaped on the spot so as to match it perfectly to the external contour of the part 14 of the fastening structure 15.

In one particular example of an embodiment of the invention, it is possible to make a shim 20 provided with rounded edges. For example, once the shim 20 has been made, the edges of the shim 20 are reshaped so as to form rounded features. Such an approach reduces the risk that the seal might get cut or worn out, especially through friction between the seal and the edges of the shim 20.

It can also be planned to cover the shim 20, having edges that may or may not be rounded, with a mastic product or a paint. Thus, possible rough features that may be present on the shim 20 are eliminated and the shim 20 then has a smooth surface. The risks of damaging the seal are accordingly further diminished.

It is possible to provide each wing 4, 5 of the aircraft 1 with a shim 20 of this kind, or only one of the two wings 4 or 5 as need be.

The invention claimed is:

1. An aircraft comprising:
 a fuselage;
 an airfoil comprising two wings fixed on either side of the fuselage, each wing being operably coupled to the fuselage by a fastening structure, the fastening structure forming a reinforcement at least one of an upper surface or a lower surface of the wing;
 a ventral fairing fixed to a lower part of the fuselage, the ventral fairing comprising a base and two panels extending radially relative to the base and rising laterally along the fuselage, each panel being provided with structure defining an opening for receiving a wing therethrough;
 a seal fixed to a periphery of each opening, the seal being at least partially positioned between an internal wall of the opening and the wing, wherein the seal is subjected to a difference in height along a transition zone defined between the fastening structure and the wing;
 wherein the aircraft includes, on at least one wing, a transition shim positioned in the transition zone between the fastening structure and the wing, a thickness of the shim decreasing from an edge of the fastening structure to the wing corresponding to the difference in height along the transition zone, thereby defining a slope of the shim, and wherein a profile of the shim restores an aerodynamic profile of the wing in the transition zone.

2. An aircraft according to claim 1, wherein the slope is configured such that a rate of compression of at a first part of the seal between the fastening structure and the internal wall of the opening and at a second part of the seal between the wing and the internal wall of the opening is uniform.

3. The aircraft according to claim 1, wherein the shim is positioned on an upper surface of the wing.

4. The aircraft according to claim 1, wherein the shim is positioned on a lower surface of the wing.

5. The aircraft according to claim 1, wherein the shim comprises an expanded plastic material.

6. The aircraft according to claim 1, wherein the shim is adhered to the wing.

7. The aircraft according to claim 1, wherein the shim is fitted with rounded ridges.

8. The aircraft according to claim 1, wherein at least a portion of an external surface of the shim is coated with sealant.

9. The aircraft according to claim 1, wherein an external contour of the shim is adapted to fit an external contour of the fastening structure at a zone of contact between said shim and said fastening structure.

* * * * *

UNITED STATES PATENT AND TRADEMARK OFFICE
CERTIFICATE OF CORRECTION

| | | |
|---|---|---|
| PATENT NO. | : 7,607,614 B2 | Page 1 of 1 |
| APPLICATION NO. | : 11/114659 | |
| DATED | : October 27, 2009 | |
| INVENTOR(S) | : Rouyre | |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 713 days Delete the phrase "by 713 days" and insert --by 1188 days--.

In the Specification:

Column 2, Line 26:
Delete "external" and insert --exterior--.

In the Claims:

Column 5, Line 38:
After "reinforcement" insert --at--.

Signed and Sealed this

Seventeenth Day of August, 2010

David J. Kappos
*Director of the United States Patent and Trademark Office*